(12) United States Patent
D'Souza et al.

(10) Patent No.: US 9,731,273 B2
(45) Date of Patent: Aug. 15, 2017

(54) USE OF LANTHANIDE OXIDES TO REDUCE SINTERING OF CATALYSTS

(71) Applicant: SABIC Global Technologies B.V., Bergen op Zoom (NL)

(72) Inventors: Lawrence D'Souza, Thuwal (SA); Vinu Viswanath, Thuwal (SA)

(73) Assignee: SABIC Global Technologies B.V., Amsterdam (NL)

( * ) Notice: Subject to any disclaimer, the term of this patent is extended or adjusted under 35 U.S.C. 154(b) by 0 days.

(21) Appl. No.: 15/077,220

(22) Filed: Mar. 22, 2016

(65) Prior Publication Data

US 2016/0199827 A1   Jul. 14, 2016

Related U.S. Application Data

(63) Continuation of application No. 14/312,105, filed on Jun. 23, 2014, now Pat. No. 9,314,771.

(51) Int. Cl.
*C01B 3/26* (2006.01)
*C01B 3/32* (2006.01)
(Continued)

(52) U.S. Cl.
CPC ............ *B01J 21/16* (2013.01); *B01J 21/04* (2013.01); *B01J 23/005* (2013.01); *B01J 23/02* (2013.01);
(Continued)

(58) Field of Classification Search
CPC . B01J 21/005; B01J 21/04; B01J 21/06; B01J 21/063; B01J 21/066; B01J 21/12; B01J 21/16; B01J 23/005; B01J 23/02; B01J 23/10; B01J 23/40; B01J 23/42; B01J 23/44; B01J 23/46; B01J 23/58;
(Continued)

(56) References Cited

U.S. PATENT DOCUMENTS

| | | | |
|---|---|---|---|
| 3,926,850 A | 12/1975 | Kostka | ............................ 252/455 |
| 3,951,860 A * | 4/1976 | Acres | ..................... B01D 53/34 |
| | | | 423/213.5 |

(Continued)

FOREIGN PATENT DOCUMENTS

| CN | 1390637 A | 1/2003 |
|---|---|---|
| CN | 101301610 A | 11/2008 |

(Continued)

OTHER PUBLICATIONS

Z. Jaworska-Galas et al. "Effect of Rare-Earth Additives on the Properties of Pt/gamma/-Al2O3 Catalysts I. Dispersity of Platinum in Pt/gamma-Al2O3 Catalysts Modified by Rare-Earth Elements." React. Kinet. Catal. Lett., vol. 19, No. 1-2, 23-26 (1982).

(Continued)

*Primary Examiner* — Cam N. Nguyen
(74) *Attorney, Agent, or Firm* — Norton Rose Fulbright US LLP

(57) ABSTRACT

Disclosed is a lanthanide oxide coated catalyst, and methods for its use, that includes a supported catalyst comprising a support material, a catalytic material, and a lanthanide oxide, wherein the lanthanide oxide is attached to at least a portion of the surface of the supported catalyst.

19 Claims, 2 Drawing Sheets

Related U.S. Application Data

(60) Provisional application No. 61/845,138, filed on Jul. 11, 2013.

(51) Int. Cl.

| | | |
|---|---|---|
| *C01B 3/38* | (2006.01) | |
| *C01B 3/40* | (2006.01) | |
| *B01J 21/00* | (2006.01) | |
| *B01J 21/04* | (2006.01) | |
| *B01J 21/06* | (2006.01) | |
| *B01J 21/12* | (2006.01) | |
| *B01J 21/16* | (2006.01) | |
| *B01J 23/00* | (2006.01) | |
| *B01J 23/02* | (2006.01) | |
| *B01J 23/10* | (2006.01) | |
| *B01J 23/40* | (2006.01) | |
| *B01J 23/42* | (2006.01) | |
| *B01J 23/44* | (2006.01) | |
| *B01J 23/46* | (2006.01) | |
| *B01J 23/58* | (2006.01) | |
| *B01J 23/63* | (2006.01) | |
| *B01J 33/00* | (2006.01) | |
| *B01J 37/02* | (2006.01) | |
| *B01J 23/83* | (2006.01) | |
| *B01J 35/00* | (2006.01) | |

(52) U.S. Cl.
CPC ............. *B01J 23/10* (2013.01); *B01J 23/42* (2013.01); *B01J 23/63* (2013.01); *B01J 23/83* (2013.01); *B01J 33/00* (2013.01); *B01J 35/006* (2013.01); *B01J 35/0046* (2013.01); *B01J 37/0242* (2013.01); *B01J 37/0244* (2013.01); *C01B 3/26* (2013.01); *C01B 3/326* (2013.01); *C01B 3/382* (2013.01); *C01B 3/386* (2013.01); *C01B 3/40* (2013.01); *C01B 2203/0233* (2013.01); *C01B 2203/0238* (2013.01); *C01B 2203/0261* (2013.01); *C01B 2203/04* (2013.01); *C01B 2203/0405* (2013.01); *C01B 2203/062* (2013.01); *C01B 2203/107* (2013.01); *C01B 2203/1041* (2013.01); *C01B 2203/1082* (2013.01); *C01B 2203/1211* (2013.01); *C01B 2203/1217* (2013.01); *C01B 2203/1241* (2013.01); *C01B 2203/1247* (2013.01); *C01B 2203/148* (2013.01); *Y02P 20/142* (2015.11)

(58) Field of Classification Search
CPC . B01J 23/63; C01B 3/26; C01B 3/326; C01B 3/382; C01B 3/386; C01B 3/40
USPC ............... 502/261–263, 302–304, 327–328, 502/332–334, 339, 341, 349–351, 355, 502/439, 524
See application file for complete search history.

(56) References Cited

U.S. PATENT DOCUMENTS

| | | | | |
|---|---|---|---|---|
| 4,425,259 A * | 1/1984 | Hettinger, Jr. | ............ | B01J 21/20 208/120.1 |
| 4,555,500 A * | 11/1985 | Kukes | ............ | B01J 23/63 502/334 |
| 4,868,150 A * | 9/1989 | Spooner | ............ | B01J 23/10 502/302 |
| 4,963,520 A * | 10/1990 | Yoo | ............ | B01J 23/005 502/304 |
| 5,750,458 A * | 5/1998 | Kennelly | ............ | B01J 23/63 423/263 |
| 6,239,063 B1 * | 5/2001 | Bogdan | ............ | B01J 23/63 502/302 |
| 6,475,951 B1 * | 11/2002 | Domesle | ............ | B01D 53/945 502/325 |
| 6,495,487 B1 * | 12/2002 | Bogdan | ............ | B01J 23/626 208/138 |
| 6,946,114 B2 * | 9/2005 | Allison | ............ | B01J 23/63 252/373 |
| 7,045,056 B2 * | 5/2006 | Kelkar | ............ | B01J 23/10 208/113 |
| 7,045,485 B2 * | 5/2006 | Kelkar | ............ | B01D 53/8628 208/113 |
| 7,476,374 B2 * | 1/2009 | Weckhuysen | ............ | A62D 3/20 423/240 R |
| 7,504,085 B2 * | 3/2009 | Yang | ............ | B01D 53/945 423/21.1 |
| 7,771,702 B2 * | 8/2010 | Eyman | ............ | B01J 21/063 423/652 |
| 7,959,792 B2 * | 6/2011 | Vaarkamp | ............ | B01J 23/63 208/113 |
| 8,133,463 B1 | 3/2012 | Berry et al. | ............ | 423/418.2 |
| 8,158,551 B2 * | 4/2012 | Verdier | ............ | B01D 53/945 502/302 |
| 8,241,600 B1 | 8/2012 | Berry et al. | ............ | 423/418.2 |
| 8,318,629 B2 * | 11/2012 | Alive | ............ | B01D 53/944 502/302 |
| 8,545,780 B1 | 10/2013 | Chen et al. | ............ | 423/213.2 |
| 8,551,908 B2 | 10/2013 | Satou et al. | ............ | 502/327 |
| 8,575,060 B2 | 11/2013 | Hsu et al. | ............ | 502/304 |
| 8,758,599 B2 | 6/2014 | Lapinski et al. | ............ | 208/138 |
| 8,852,519 B2 | 10/2014 | Watanabe et al. | ............ | 422/180 |
| 8,865,615 B2 | 10/2014 | Ito et al. | ............ | 502/262 |
| 8,945,497 B2 | 2/2015 | Headdock et al. | ............ | 423/245.1 |
| 9,011,784 B2 * | 4/2015 | Golden | ............ | C01G 25/00 422/177 |
| 9,012,353 B2 * | 4/2015 | Golden | ............ | F01N 3/101 502/258 |
| 9,034,269 B2 | 5/2015 | Hilgendorff et al. | ............ | 422/170 |
| 2002/0115730 A1 | 8/2002 | Allison et al. | ............ | 518/703 |
| 2002/0131928 A1 * | 9/2002 | Keller | ............ | B01D 53/8612 423/576.8 |
| 2002/0134706 A1 * | 9/2002 | Keller | ............ | B01D 53/8612 208/250 |
| 2003/0165424 A1 | 9/2003 | Ramani et al. | ............ | 423/651 |
| 2004/0052725 A1 * | 3/2004 | Niu | ............ | B01J 23/63 423/651 |
| 2004/0142815 A1 | 7/2004 | Ramani et al. | ............ | 502/325 |
| 2005/0112047 A1 * | 5/2005 | Allison | ............ | B01J 23/63 423/418.2 |
| 2007/0191221 A1 | 8/2007 | Hussain et al. | ............ | 502/319 |
| 2008/0237542 A1 | 10/2008 | Schmidt et al. | ............ | 252/373 |
| 2009/0220413 A1 | 9/2009 | Sumio et al. | ............ | 423/652 |
| 2011/0079543 A1 | 4/2011 | Willis et al. | ............ | 208/119 |
| 2012/0024757 A1 | 2/2012 | Xia et al. | ............ | 208/177 |

FOREIGN PATENT DOCUMENTS

| | | |
|---|---|---|
| WO | WO 02/20395 | 3/2002 |
| WO | WO 2008/153826 | 12/2008 |
| WO | WO 2014/184685 | 11/2014 |
| WO | WO 2014/188278 | 11/2014 |

OTHER PUBLICATIONS

A. Moronta et al. "Nickel Catalysts Supported on MgO/Smectite-Type Nanocomposites for Methane Reforming." Clays and Clay Minerals, vol. 53, No. 6, 622-630, 2005.

S. Gaur et al. "Rh, Ni, and Ca Substituted Pyrochlore Catalysts for dry reforming of Methane." Applied Catalysis A: General 403 (2011) 142-151.

D. J. Haynes et al. "Catalytic partial oxidation of n-tetradecane using pyrochlores: Effect of Rh and Sr." Catalysis Today 136 (2008) 206-213.

J. R. Rostrup et al. "A review article: Hydrogen and synthesis gas by steam and CO2 reforming." Adv. Catal. 47 (2002) 65-139.

(56) References Cited

OTHER PUBLICATIONS

D. Pakhare et al. "Role of metal substitution in lanthanum zirconate pyrochlores." Appl. Petrochem Res. (2012) 2:27-35.
M. S. Prasad et al. "Kaolin: processing, properties and applications." Applied Clay Science, 6, 1991, 87-119.
B. C. A. Pinheiro et al. "Obtainment of porcelain floor tiles added with petroleum oily sludge." Ceramics International. 39 (1) 2013, 57-63.
A. Feriancovaet al. "The influence of kaolin filler on thermal and spectral characteristics of rubberizing components without rubber." Journal of Thermal Analysis and Calorimetry 2013, 1-6.
S. Gaur. "Dry Reforming of Methane on Rhodium and Nickel Substituted Pyrochlore Catalysts." Date of Submission: Apr. 21, 2011.
P. Jiang, et al. "Methane Decompositon over Ni/α-Al2O3 Promoted by La2O3 and CeO2" Journal of Natural Gas Chemistry 12:183-188, 2003.
International Search Report for PCT/IB2014/002181 dated Feb. 2, 2015.
Office Action for CN201480030757.3, dated Aug. 2, 2016.
Yan et al., "Partial Oxidation of Methane to Syngas over Pt/$Al_2O_3$ and Pt/$CeO_2$/$Al_2O_3$", *Chemical Journal of Chinese Universities* 19(8):1300-1303, 1998. (Chinese text with English abstract).

\* cited by examiner

USE OF LANTHANIDE OXIDES TO REDUCE SINTERING OF CATALYSTS

CROSS REFERENCE TO RELATED APPLICATIONS

This application is a continuation of U.S. patent application Ser. No. 14/312,105, filed Jun. 23, 2014, now U.S. Pat. No. 9,314,771 B 2, which claims priority to U.S. Provisional Patent Application No. 61/845,138, filed on Jul. 11, 2013. The entire contents of each of the above-referenced disclosures are specifically incorporated herein by reference without disclaimer.

BACKGROUND OF THE INVENTION

A. Field of the Invention

The invention generally concerns the use of lanthanide oxides to reduce sintering of supported catalysts during use.

B. Description of Related Art

Catalysts are oftentimes used in the chemical industry to change the rate of a given chemical reaction—they can make the desired chemical reaction more favorable or likely to occur. Further, the efficiency of a catalyst can be improved by increasing its surface area, which provides for more reaction sites during the chemical reaction process.

Notably, however, catalysts are oftentimes subjected to elevated temperatures (e.g., greater than 700° C. or 800° C.), such as in syngas production or methane reformation reactions. These temperatures can lead to the agglomeration or sintering of the catalytic materials used. This can result in surface area reduction during the reaction, thereby reducing the effectiveness of the catalyst during the reaction to complete failure of the catalyst/catalyst deactivation.

While some attempts have been made to reduce sintering at elevated temperatures, one of the more effective solutions is to simply increase the amount of catalyst used at the start of the reaction process or to continuously re-supply the catalyst during the reaction. This can increase the costs associated with the chemical reaction process as well complicate the reaction procedures.

SUMMARY OF THE INVENTION

A solution to the sintering problems has been discovered. The solution resides in the use of lanthanide oxides to reduce sintering of catalytic materials. By way of example, lanthanide oxides can be used to coat a portion of the surface of a catalyst, which leads to reduced sintering when the catalyst is used at elevated temperatures. In one particular aspect, it has been discovered that a certain weight ratio of lanthanide oxide to catalytic material works well in reducing sintering of the catalyst during use.

In one particular aspect, there is disclosed a lanthanide oxide coated catalyst comprising a supported catalyst comprising a support material and a catalytic material, and a lanthanide oxide, wherein the lanthanide oxide is attached to at least a portion of the surface of the supported catalyst. In certain aspects, the amount of lanthanide oxide that is present is an amount that is effective at reducing or preventing sintering of the catalytic material and/or support material during use of said catalyst at elevated temperatures (e.g., greater than 700° C. or 800° C. or at a temperature range of greater than 700° C. to 1100° C. or 800° C. to 1100° C.), such as during syngas production or methane reformation reactions. In certain aspects, an effective amount of lanthanide oxide to reduce sintering can be 2, 4, 6, 8, 10, 15, 20, 25, or 30% by weight of the lanthanide oxide based on the total weight of the catalyst. In other aspects, an effective amount of lanthanide oxide to reduce sintering can be a selected weight ratio of the lanthanide oxide to the catalytic material (e.g., catalytic metal), such as a ratio of at least 5:1 or from 5:1 to 10:1, or from 6:1 to 8:1. Further, an effective amount of lanthanide oxide to reduce sintering can be a selected weight ratio of the lanthanide oxide to the supported catalyst, such as a ratio of from 5:100 to 20:100 or 10:100 to 15:100. In some aspects, the catalytic material can be a catalytic metal. The catalytic metal can be Pt, Pd, Au, Ag, Ni, Co, Fe, Mn, Cu, Zn, Mo, Rh, Ru, or Ir, or any combination thereof. In more particular embodiments, the catalytic metal can be Ni, Pt, Rh, Au, Ag, or Ru or any combination thereof. In still other aspects, the catalytic material can be a combination of a noble metal and a base metal. Such non-limiting combinations can include PtX, PdX, AuX, AgX, RhX, RuX, or IrX, where X=Ni, Co, Fe, Mn, Cu, Zn, or Mo. The lanthanide oxide that can be used includes, but is not limited to, $CeO_2$, $Pr_2O_3$, $Eu_2O_3$, $Nd_2O_3$, $Gd_2O_3$, or $La_2O_3$, or any combination thereof. In particular instances, the lanthanide oxide is $CeO_2$. The support material can be a metal oxide, an alkaline earth metal/metal oxide compound, a clay mineral, a pervoskite, or a zeolite based support. The metal oxide can be silica, aluminum oxide, zirconium oxide, titanium dioxide, or cerium oxide. In certain aspects, the lanthanide oxide coated catalyst can include 0.1 to 20% by weight of the catalytic metal and/or 1 to 50% by weight of the lanthanide oxide and/or 99 to 50% by weight of the support material. The lanthanide oxide coated catalyst can be in particulate form, such as having a particle size ranging from 5 to 1000 μm. In other aspects, the lanthanide oxide coated catalyst can be in non-powdered form or can have a fabricated geometry. The fabricated geometry can be a pellet, foam, honeycomb, or monolith. The lanthanide oxide can be dispersed on the surface of the supported catalyst. In particular instances, the lanthanide oxide coated catalyst is capable of reducing sintering of the catalytic metal when subjected to temperatures at a range of greater than 700° C. to 1100° C. or a range from 725° C., 750° C., 775° C., or 800° C. to 900° C., 1000° C., or 1100° C., or at a range from 800° C. to 1000° C., or from 800° C. to 1100° C. The lanthanide oxide coated catalyst is also capable of catalyzing the production of a gaseous mixture comprising hydrogen and carbon monoxide from a hydrocarbon gas, such as methane. In particular instances, the lanthanide oxide coated catalyst can have the structure of 10 wt % $CeO_2$/2 wt % Pt/$Al_2O_3$, 8 wt % $CeO_2$/2 wt % Pt/$Al_2O_3$, 5 wt % $CeO_2$/2 wt % Pt/$Al_2O_3$, or 2 wt % $CeO_2$/2 wt % Pt/$Al_2O_3$. In other instances, the lanthanide oxide coated catalyst can have the structure of 10 wt % $CeO_2$/2 wt % Pt/$MgAl_2O_4$, 8 wt % $CeO_2$/2 wt % Pt/$MgAl_2O_4$, 5 wt % $CeO_2$/2 wt % Pt/$MgAl_2O_4$, or 2 wt % $CeO_2$/2 wt % Pt/$MgAl_2O_4$. In still other instances, the lanthanide oxide coated catalyst can have the structure of 10 wt % $CeO_2$/2 wt % Pt/kaolinite, 8 wt % $CeO_2$/2 wt % Pt/kaolinite, 5 wt % $CeO_2$/2 wt % Pt/kaolinite, or 2 wt % $CeO_2$/2 wt % Pt/kaolinite.

Also disclosed is a method of reducing or preventing sintering of a supported catalyst during use. The supported catalyst can include a support material and a catalytic material, such as those discussed throughout the specification and incorporated into this paragraph by reference. The method can include grafting a lanthanide oxide to at least a portion of the surface of the supported catalyst in an amount sufficient to reduce or prevent sintering of a supported catalyst during use. In some aspects, the ability of the lanthanide oxide coated catalysts of the present invention to reduce or prevent sintering can be determined by comparing said catalyst with a similar catalyst that does not include the lanthanide oxide coating. Further, and as discussed above, an effective amount of lanthanide oxide to reduce sintering can be 2, 4, 6, 8, 10, 15, 20, 25, or 30% by weight of the lanthanide oxide based on the total weight of the catalyst. In other aspects, an effective amount of lanthanide oxide to reduce sintering can be a selected weight ratio of the lanthanide oxide to the catalytic material (e.g., catalytic metal), such as a ratio of at least 5:1 or from 5:1 to 10:1, or from 6:1 to 8:1. Further, an effective amount of lanthanide oxide to reduce sintering can be a selected weight ratio of the lanthanide oxide to the supported catalyst, such as a ratio of from 5:100 to 20:100 or 10:100 to 15:100. Also, increasing the amount of the lanthanide oxide attached to the surface of the supported catalyst can further reduce sintering of the supported catalyst during use. The method can further include subjecting the supported catalyst to a temperature at a range of greater than 700° C. to 1100° C. or a range from 725° C., 750° C., 775° C., or 800° C. to 900° C., 1000° C., or 1100° C., or at a range from 800° C. to 1000° C., or from 800° C. to 1100° C., while reducing or avoiding any significant sintering of the catalyst, support material, and/or catalytic material.

Also disclosed is a method of producing a gaseous mixture comprising contacting a reactant gas mixture comprising a hydrocarbon and an oxidant with any one of the lanthanide oxide coated catalysts discussed above and/or throughout this specification under conditions sufficient to produce a gaseous mixture comprising hydrogen and carbon monoxide. Further, there is disclosed a method of catalytically reforming a reactant gas mixture comprising providing a reactant gas mixture comprising a hydrocarbon and an oxidant, providing any one of the lanthanide oxide coated catalysts discussed above and/or throughout this specification, and contacting the reactant gas mixture with the lanthanide oxide coated catalyst under conditions sufficient to produce a gaseous mixture comprising carbon monoxide and hydrogen. Such conditions sufficient to produce said gaseous mixture can include a temperature range of 700° C. to 1100° C. or a range from 725° C., 750° C., 775° C., or 800° C. to 900° C., 1000° C., or 1100° C. or from 800° C. to 1000° C. or from 800° C. to 1100° C., a pressure range of from 1 bara to 30 bara, and/or a gas hourly space velocity (GHSV) ranging from 500 to 10000 $h^{-1}$. In particular instances, the hydrocarbon comprises methane. In certain aspects, the oxidant comprises carbon dioxide, oxygen, or water, or any combination thereof. In particular instances, the hydrocarbon comprises methane and the oxidant comprises carbon dioxide or a mixture of carbon dioxide and oxygen, and the ratio of carbon monoxide to hydrogen in the produced gaseous mixture is approximately 1:1 or 1. In other aspects, the hydrocarbon comprises methane and the oxidant comprises water (e.g., water vapor or steam), and the ratio of carbon monoxide to hydrogen in the produced gaseous mixture is approximately 1:3 or 0.33. The reactant gas mixture can include natural gas, liquefied petroleum gas comprising $C_2$-$C_5$ hydrocarbons, $C_6$+ heavy hydrocarbons (e.g., $C_6$ to $C_{24}$ hydrocarbons such as diesel fuel, jet fuel, gasoline, tars, kerosene, etc.), oxygenated hydrocarbons, and/or biodiesel, alcohols, or dimethyl ether. In particular instances, the reactant gas mixture has an overall oxygen to carbon atomic ratio equal to or greater than 0.9. The method can further include isolating and/or storing the produced gaseous mixture. The method can also include separating hydrogen from the produced gaseous mixture (such as by passing said produced gaseous mixture through a hydrogen selective membrane to produce a hydrogen permeate). The method can include separating carbon monoxide from the produced gaseous mixture (such as by passing said produced gaseous mixture through a carbon monoxide selective membrane to produce a carbon monoxide permeate). In certain aspects, the carbon formation or coking is reduced or does not occur on the supported catalyst and/or sintering is reduced or does not occur on the supported catalyst. In particular instances, carbon formation or coking and/or sintering is reduced or does not occur when said supported catalyst is subjected to temperatures at a range of greater than 700° C. to 1100° C. or a range from 725° C., 750° C., 775° C., or 800° C. to 900° C., 1000° C., or 1100° C. In particular instances, the range can be from 800° C. to 1000° C. or from 800° C. to 1100° C.

Also disclosed are embodiments 1 to 69. Embodiment 1 concerns a lanthanide oxide coated catalyst comprising: (a) a supported catalyst comprising a support material and a catalytic material; and (b) a lanthanide oxide, wherein the lanthanide oxide is attached to at least a portion of the surface of the supported catalyst. Embodiment 2 is the lanthanide oxide coated catalyst of embodiment 1, wherein the catalytic material is a catalytic metal. Embodiment 3 is the lanthanide oxide coated catalyst of embodiment 2, wherein the weight ratio of the lanthanide oxide to the catalytic metal is at least 5:1 or is from 5:1 to 10:1, or is from 6:1 to 8:1. Embodiment 4 is the lanthanide oxide coated catalyst of any one of embodiments 2 to 3, wherein the catalytic metal comprises Pt, Pd, Au, Ag, Ni, Co, Fe, Mn, Cu, Zn, Mo, Rh, Ru, or Ir, or any combination thereof. Embodiment 5 is the lanthanide oxide coated catalyst of embodiment 4, wherein the catalytic metal is Ni, Pt, Rh, Au, Ag, or Ru or any combination thereof. Embodiment 6 is the lanthanide oxide coated catalyst of embodiment 5, wherein the catalytic metal is Pt. Embodiment 7 is the lanthanide oxide coated catalyst of embodiment 1, wherein the catalytic material is a combination of a noble metal and a base metal or wherein the catalytic material includes PtX, PdX, AuX, AgX, RhX, RuX, or IrX, where X=Ni, Co, Fe, Mn, Cu, Zn, or Mo. Embodiment 8 is the lanthanide oxide coated catalyst of any one of embodiments 1 to 7, wherein the lanthanide oxide is $CeO_2$, $Pr_2O_3$, $Eu_2O_3$, $Nd_2O_3$, $Gd_2O_3$, or $La_2O_3$, or any combination thereof. Embodiment 9 is the lanthanide oxide coated catalyst of embodiment 8, wherein the lanthanide oxide is $CeO_2$. Embodiment 10 is the lanthanide oxide coated catalyst of embodiment 1, wherein the weight ratio of the lanthanide oxide to the supported catalyst is from 5:100 to 20:100 or 10:100 to 15:100. Embodiment 11 is the lanthanide oxide coated catalyst of any one of embodiments 1 to 10, wherein the support material is a metal oxide, an alkaline earth metal/metal oxide compound, a clay mineral, a pervoskite, or a zeolite based support. Embodiment 12 is the lanthanide oxide coated catalyst of embodiment 11, wherein the metal oxide is silica, aluminum oxide, zirconium oxide, titanium dioxide, or cerium oxide. Embodiment 13 is the lanthanide oxide coated catalyst of any one of embodiments 1 to 12, comprising 0.1 to 20% by weight of the catalytic metal and/or 1 to 50% by weight of the lanthanide oxide and/or 99 to 50% by weight of the support material. Embodiment 14 is the lanthanide oxide coated catalyst of any one of embodiments 1 to 13, wherein the coated catalyst is in particulate form. Embodiment 15 is the lanthanide oxide coated catalyst of embodiment 14, wherein the particle size of the coated catalyst ranges from 5 to 1000 μm. Embodiment 16 is the lanthanide oxide coated catalyst of any one of embodiments 1 to 15, wherein coated catalyst is in non-powdered form or has a fabricated geometry.

Embodiment 17 is the lanthanide oxide coated catalyst of embodiment 16, wherein the fabricated geometry is a pellet, foam, honeycomb, or monolith. Embodiment 18 is the lanthanide oxide coated catalyst of any one of embodiments 1 to 17, wherein the lanthanide oxide is dispersed on the surface of the supported catalyst. Embodiment 19 is the lanthanide oxide coated catalyst of any one of embodiments 1 to 18, wherein the coated catalyst is capable of reducing sintering of the catalytic metal when subjected to temperatures at a range of greater than 700° C. to 1100° C. or a range from 725° C., 750° C., 775° C., or 800° C. to 900° C., 1000° C., or 1100° C., or at a range from 800° C. to 1000° C., or from 800° C. to 1100° C. Embodiment 20 is the lanthanide oxide coated catalyst of any one of embodiments 1 to 19, wherein the coated catalyst is capable of catalyzing the production of a gaseous mixture comprising hydrogen and carbon monoxide from a hydrocarbon gas. Embodiment 21 is the hydrocarbon gas reforming supported catalyst of embodiment 20, wherein the hydrocarbon gas is methane. Embodiment 22 is the lanthanide oxide coated catalyst of embodiment 1, having the structure of 10 wt % $CeO_2$/2 wt % $Pt/Al_2O_3$, 8 wt % $CeO_2$/2 wt % $Pt/Al_2O_3$, 5 wt % $CeO_2$/2 wt % $Pt/Al_2O_3$, or 2 wt % $CeO_2$/2 wt % $Pt/Al_2O_3$. Embodiment 23 is the lanthanide oxide coated catalyst of embodiment 1, having the structure of 10 wt % $CeO_2$/2 wt % $Pt/MgAl_2O_4$, 8 wt % $CeO_2$/2 wt % $Pt/MgAl_2O_4$, 5 wt % $CeO_2$/2 wt % $Pt/MgAl_2O_4$, or 2 wt % $CeO_2$/2 wt % $Pt/MgAl_2O_4$. Embodiment 24 is the lanthanide oxide coated catalyst of embodiment 1, having the structure of 10 wt % $CeO_2$/2 wt % Pt/kaolinite, 8 wt % $CeO_2$/2 wt % Pt/kaolinite, 5 wt % $CeO_2$/2 wt % Pt/kaolinite, or 2 wt % $CeO_2$/2 wt % Pt/kaolinite. Embodiment 25 is a method of reducing or preventing sintering of a supported catalyst during use, the supported catalyst comprising a support material and a catalytic material, the method comprising grafting a lanthanide oxide to at least a portion of the surface of the supported catalyst in an amount sufficient to reduce or prevent sintering of a supported catalyst during use when compared with a supported catalyst that does not include the lanthanide oxide. Embodiment 26 is the method of embodiment 25, wherein the supported catalyst is subjected to temperatures at a range of greater than 700° C. to 1100° C. or a range from 725° C., 750° C., 775° C., or 800° C. to 900° C., 1000° C., or 1100° C., or at a range from 800° C. to 1000° C., or from 800° C. to 1100° C. during use. Embodiment 27 is the method of any one of embodiments 25 to 26, wherein increasing the amount of the lanthanide oxide attached to the surface of the supported catalyst further reduces sintering of the supported catalyst during use. Embodiment 28 is the method of any one of embodiments 25 to 27, wherein the catalytic material is a catalytic metal. Embodiment 29 is the method of embodiment 28, wherein the weight ratio of the lanthanide oxide to the catalytic metal is at least 5:1 or is from 5:1 to 10:1, or is from 6:1 to 8:1. Embodiment 30 is the method of any one of embodiments 28 to 29, wherein the catalytic metal comprises Pt, Pd, Au, Ag, Ni, Co, Fe, Mn, Cu, Zn, Mo, Rh, Ru, or Ir, or any combination thereof. Embodiment 31 is the method of embodiment 30, wherein the catalytic metal is Ni, Pt, Rh, Au, Ag, or Ru or any combination thereof. Embodiment 32 is the method of embodiment 31, wherein the catalytic metal is Pt. Embodiment 33 is the method of embodiment 25, wherein the catalytic material is a combination of a noble metal and a base metal or wherein the catalytic material includes PtX, PdX, AuX, AgX, RhX, RuX, or IrX, where X=Ni, Co, Fe, Mn, Cu, Zn, or Mo. Embodiment 34 is the method of any one of embodiments 25 to 33, wherein the lanthanide oxide is $CeO_2$, $Pr_2O_3$, $Eu_2O_3$, $Nd_2O_3$, $Gd_2O_3$, or $La_2O_3$, or any combination thereof. Embodiment 35 is the method of embodiment 34, wherein the lanthanide oxide is $CeO_2$. Embodiment 36 is the method of embodiment 35, wherein the weight ratio of the lanthanide oxide to the supported catalyst is from 5:100 to 20:100 or 10:100 to 15:100. Embodiment 37 is the method of embodiments 25 to 36, wherein the support material is a metal oxide, an alkaline earth metal/metal oxide compound, a clay mineral, a pervoskite, or a zeolite based support. Embodiment 38 is the method of embodiment 37, wherein the metal oxide is silica, aluminum oxide, zirconium oxide, titanium dioxide, or cerium oxide. Embodiment 39 is the method of any one of embodiments 25 to 38, comprising 0.1 to 20% by weight of the catalytic metal and/or 1 to 50% by weight of the lanthanide oxide and/or 99 to 50% by weight of the support material. Embodiment 40 is the method of any one of embodiments 25 to 39, wherein the coated catalyst is in particulate form. Embodiment 41 is the method of embodiment 40, wherein the particle size of the coated catalyst ranges from 5 to 1000 μm. Embodiment 42 is the method of any one of embodiments 25 to 41, wherein coated catalyst is in non-powdered form or has a fabricated geometry. Embodiment 43 is the method of embodiment 42, wherein the fabricated geometry is a pellet, foam, honeycomb, or monolith. Embodiment 44 is the method of any one of embodiments 25 to 43, wherein the lanthanide oxide is dispersed on the surface of the supported catalyst. Embodiment 45 is the method of any one of embodiments 25 to 44, wherein the coated catalyst is capable of reducing sintering of the catalytic metal when subjected to temperatures at a range of greater than 700° C. to 1100° C. or a range from 725° C., 750° C., 775° C., or 800° C. to 900° C., 1000° C., or 1100° C., or at a range from 800° C. to 1000° C., or from 800° C. to 1100° C. Embodiment 46 is the method of any one of embodiments 25 to 45, wherein the coated catalyst is capable of catalyzing the production of a gaseous mixture comprising hydrogen and carbon monoxide from a hydrocarbon gas. Embodiment 47 is the method of embodiment 46, wherein the hydrocarbon gas is methane. Embodiment 48 is the method of embodiment 25, wherein the supported catalyst has the structure of 10 wt % $CeO_2$/2 wt % $Pt/Al_2O_3$, 8 wt % $CeO_2$/2 wt % $Pt/Al_2O_3$, 5 wt % $CeO_2$/2 wt % $Pt/Al_2O_3$, or 2 wt % $CeO_2$/2 wt % $Pt/Al_2O_3$. Embodiment 49 is the method of embodiment 25, wherein the supported catalyst has the structure of 10 wt % $CeO_2$/2 wt % $Pt/MgAl_2O_4$, 8 wt % $CeO_2$/2 wt % $Pt/MgAl_2O_4$, 5 wt % $CeO_2$/2 wt % $Pt/MgAl_2O_4$, or 2 wt % $CeO_2$/2 wt % $Pt/MgAl_2O_4$. Embodiment 50 is the method of embodiment 25, wherein the supported catalyst has the structure of 10 wt % $CeO_2$/2 wt % Pt/kaolinite, 8 wt % $CeO_2$/2 wt % Pt/kaolinite, 5 wt % $CeO_2$/2 wt % Pt/kaolinite, or 2 wt % $CeO_2$/2 wt % Pt/kaolinite. Embodiment 51 is a method of producing a gaseous mixture comprising contacting a reactant gas mixture comprising a hydrocarbon and an oxidant with the lanthanide oxide coated catalyst of any one of embodiments 1 to 24 under conditions sufficient to produce a gaseous mixture comprising hydrogen and carbon monoxide. Embodiment 52 is a method of catalytically reforming a reactant gas mixture comprising: (a) providing a reactant gas mixture comprising a hydrocarbon and an oxidant; (b) providing the lanthanide oxide coated catalyst of any one of claims 1 to 24; and (c) contacting the reactant gas mixture with the lanthanide oxide coated catalyst under conditions sufficient to produce a gaseous mixture comprising carbon monoxide and hydrogen. Embodiment 53 is the method of any one of embodiments 51 to 52, wherein the hydrocarbon comprises methane. Embodiment 54 is the method of any one of embodiments 51 to 53, wherein the oxidant comprises carbon dioxide, oxygen, or water, or any combination thereof. Embodiment 55 is the method of embodiment 54, wherein the hydrocarbon comprises methane and the oxidant comprises carbon dioxide or a mixture of carbon dioxide and oxygen. Embodiment 56 is the method of embodiment 55, wherein the ratio of carbon monoxide to hydrogen in the produced gaseous mixture is approximately 1. Embodiment 57 is the method of embodiment 54, wherein the hydrocarbon comprises methane and the oxidant comprises water. Embodiment 58 is the method of embodiment 57, wherein the water is water vapor. Embodiment 59 is the method of any one of embodiments 57 to 58, wherein the ratio of carbon monoxide to hydrogen in the produced gaseous mixture is approximately 0.33. Embodiment 60 is the method of any one of embodiments 51 to 52, wherein the reactant gas mixture comprises natural gas. Embodiment 61 is the method of any one of embodiments 51 to 52, wherein the reactant gas mixture comprises liquefied petroleum gas comprising $C_2$-$C_5$ hydrocarbons. Embodiment 62 is the method of any one of embodiments 51 to 52, wherein the reactant gas mixture comprises $C_6$+ heavy hydrocarbons. Embodiment 63 is the method of embodiment 62, wherein the $C_6$+ heavy hydrocarbons comprise diesel fuel, jet fuel, gasoline, tars, or kerosene. Embodiment 64 is the method of any one of embodiments 51 to 52, wherein the reactant gas mixture comprises oxygenated hydrocarbons. Embodiment 65 is the method of embodiment 64, wherein the oxygenated hydrocarbons comprise biodiesel, alcohols, or dimethyl ether. Embodiment 66 is the method of any one of embodiments 51 to 52, wherein the reactant gas mixture has an overall oxygen to carbon atomic ratio equal to or greater than 0.9. Embodiment 67 is the method of any one of embodiments 51 to 66, further comprising contacting the reactant gas mixture with the lanthanide oxide coated catalyst at a temperature ranging from 700° C. to 1100° C. or a range from 725° C., 750° C., 775° C., or 800° C. to 900° C., 1000° C., or 1100° C., at a pressure ranging from 1 bara to 30 bara, and/or at a gas hourly space velocity (GHSV) ranging from 500 to 10000 $h^{-1}$. Embodiment 68 is the method of any one of embodiments 51 to 67, wherein sintering is reduced or does not occur on the supported catalyst when compared with a similar catalyst that does not include the lanthanide oxide. Embodiment 69 is the method of any one of embodiments 51 to 68, wherein carbon formation and/or sintering is reduced or does not occur when said supported catalyst is subjected to temperatures greater than 700° C. to 1100° C. or a range from 725° C., 750° C., 775° C., or 800° C. to 900° C., 1000° C., or 1100° C.

The term "about" or "approximately" are defined as being close to as understood by one of ordinary skill in the art, and in one non-limiting embodiment the terms are defined to be within 10%, preferably within 5%, more preferably within 1%, and most preferably within 0.5%.

The term "substantially" and its variations are defined as being largely but not necessarily wholly what is specified as understood by one of ordinary skill in the art, and in one non-limiting embodiment substantially refers to ranges within 10%, within 5%, within 1%, or within 0.5%.

The terms "inhibiting" or "reducing" or "preventing" or "avoiding" or any variation of these terms, when used in the claims and/or the specification includes any measurable decrease or complete inhibition to achieve a desired result.

The term "effective," as that term is used in the specification and/or claims, means adequate to accomplish a desired, expected, or intended result.

The use of the word "a" or "an" when used in conjunction with the term "comprising" in the claims or the specification may mean "one," but it is also consistent with the meaning of "one or more," "at least one," and "one or more than one."

The words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The catalysts of the present invention can "comprise," "consist essentially of," or "consist of" particular ingredients, components, compositions, etc. disclosed throughout the specification. With respect to the transitional phase "consisting essentially of," in one non-limiting aspect, a basic and novel characteristic of the catalysts of the present invention are their ability to reduce sintering of the catalytic material and/or on the support material.

Other objects, features and advantages of the present invention will become apparent from the following figures, detailed description, and examples. It should be understood, however, that the figures, detailed description, and examples, while indicating specific embodiments of the invention, are given by way of illustration only and are not meant to be limiting. Additionally, it is contemplated that changes and modifications within the spirit and scope of the invention will become apparent to those skilled in the art from this detailed description.

DETAILED DESCRIPTION OF THE INVENTION

Figure 1:
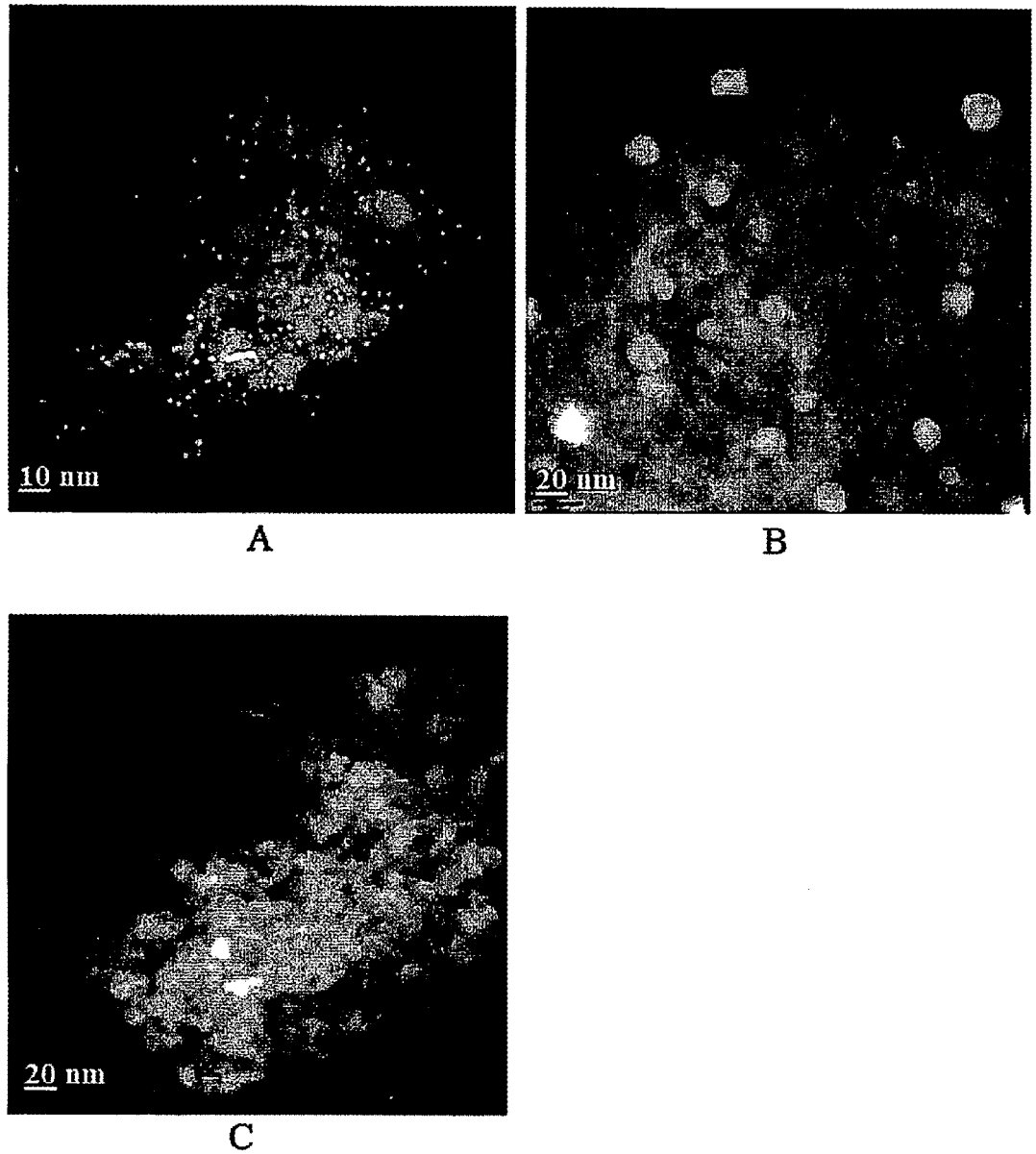
FIG. 1: Scanning electron micrographs of (A) 2 wt % Pt/$Al_2O_3$ 250° C. reduced, (B) 2 wt % Pt/$Al_2O_3$ 800° C. reduced for 4 hours, and (C) 10 wt % $CeO_2$/2 wt % Pt/$Al_2O_3$ reduced at 800° C. for 4 hours.

The currently available catalysts used to reform hydrocarbons into syngas are prone to sintering, which can lead to inefficient catalyst performance and ultimately failure of the catalyst after relatively short periods of use. This can lead to inefficient syngas production as well increased costs associated with its production.

A discovery has been made that avoids the sintering issues described above. The discovery is based on the use of lanthanide oxides to reduce or prevent sintering—the lanthanide oxides can be used to create sinter resistant catalysts when such catalysts are used at elevated temperatures. Without wishing to be bound by theory, it is believed that the lanthanide oxides can reduce or prevent agglomeration of the support material and the catalytic material at elevated temperatures, thereby reducing or preventing sintering of said materials. Further, the use of lanthanide oxides as a coating on particular supported catalysts (such as the clay mineral or alkaline earth metal/metal oxide supported catalysts disclosed in U.S. Provisional Applications 61/821,514, filed May 9, 2013, and 61/821,522, filed May 9, 2013, both of which are incorporated into the present application by reference), further reduces the occurrence of sintering at elevated temperatures.

These and other non-limiting aspects of the present invention are discussed in further detail in the following sections.

A. Lanthanide Oxides

Lanthanides that can be used in the context of the present invention to create lanthanide oxides include lanthanum (La), cerium (Ce), gadolinium (Gd), neodymium (Nd), praseodymium (Pr), and Europium (Eu), or combinations of such lanthanides. Non-limiting examples of lanthanide oxides include $CeO_2$, $Pr_2O_3$, $Eu_2O_3$, $Nd_2O_3$, $Gd_2O_3$, or $La_2O_3$, or any combination thereof. Salts of lanthanide (e.g., chlorides, nitrates, sulphates, etc.) can be obtained from commercial sources such as Sigma-Aldrich, Alfa-Aeaser, Strem, etc. Lanthanide oxides can be produced by methods known in the art such as by high temperature (e.g., >500° C.) decomposition of lanthanide salts or by precipitation of salts into respective hydroxides followed by calcination to the oxide form.

B. Support Material

A variety of support materials can be used in the context of the present invention. For instance, the support material can be a metal oxide, an alkaline earth metal/metal oxide compound, a clay mineral, a pervoskite, or a zeolite based support. With respect to metal oxide supports, non-limiting examples that can be used include silica, aluminum oxide, zirconium oxide, titanium dioxide, or cerium oxide, or combinations thereof.

For clay mineral supports, non-limiting examples of such materials are provided below. In particular instances, however, clay minerals having a 1:1 silicate layer structural format can be used (e.g., kaolinite). Typically, a clay mineral includes silica, alumina or magnesia or both, and water. Some clay minerals may be expressed using ideal chemical formulas as the following: $2SiO_2 \cdot Al_2O_3 \cdot 2H_2O$ (kaolinite), $4SiO_2 \cdot Al_2O_3 \cdot H_2O$ (pyrophyllite), $4SiO_2 \cdot 3MgO \cdot H_2O$ (talc), and $3 SiO_2 \cdot Al_2O_3 \cdot 5FeO \cdot 4H_2O$ (chamosite). The $SiO_2$ ratio is a key factor for determining clay mineral types. Clay minerals can be classified on the basis of variations of chemical composition and atomic structure into nine groups: (1) kaolin-serpentine (kaolinite, halloysite, lizardite, chrysotile), (2) pyrophyllite-talc, (3) mica (illite, glauconite, celadonite), (4) vermiculite, (5) smectite (montmorillonite, nontronite, saponite), (6) chlorite (sudoite, clinochlore, chamosite), (7) sepiolite-palygorskite, (8) interstratified clay minerals (e.g., rectorite, corrensite, tosudite), and (9) allophane-imogolite.

The prevalent structural feature of clay minerals is the presence of hydrous-layer silicates. These features are continuous two-dimensional tetrahedral sheets of $Si_2O_5$, with $SiO_4$ tetrahedrons linked by the sharing of three corners of each tetrahedron to form a hexagonal mesh pattern. The apical oxygen at the fourth corner of the tetrahedrons, which is usually directed normal to the sheet, forms part of an adjacent octahedral sheet in which octahedrons are linked by sharing edges. There are two major types for the structural "backbones" of clay minerals called silicate layers. The unit silicate layer formed by aligning one octahedral sheet to one tetrahedral sheet is referred to as a 1:1 silicate layer, and the exposed surface of the octahedral sheet consists of hydroxyls. In another type, the unit silicate layer consists of one octahedral sheet sandwiched by two tetrahedral sheets that are oriented in opposite directions and is termed a 2:1 silicate layer. Therefore, a clay mineral comprising a 1:1 silicate layer is one in which an octahedral sheep is aligned with a tetrahedral sheet. By comparison, a clay mineral comprising a 2:1 silicate layer is one in which an octahedral sheet is aligned with a tetrahedral sheet on one side and a second tetrahedral sheet on the opposing side.

Kaolin-serpentine groups of clay minerals are 1:1 layer silicates. Their basic unit of structure includes tetrahedral and octahedral sheets in which the anions at the exposed surface of the octahedral sheet are hydroxyls. Therefore, their general structure can be expressed as: $Y_{2-3}Z_2O_5(OH)_4$, where Y are cations in the octahedral sheet such as $Al^{3+}$ and $Fe^{3+}$ for dioctahedral species and $Mg^{2+}$, $Fe^{2+}$, $Mn^{2+}$, and $Ni^{2+}$ for trioctahedral species, and Z are cations in the tetrahedral sheet, largely Si and, to a lesser extent, Al and $Fe^{3+}$. Kaolinite has a structural formula of $Al_2Si_2O_5(OH)_4$. Kaolinite is electrostatically neutral and has triclinic symmetry. Dickite and nacrite are polytypic varieties of kaolinite, both of which include a double 1:1 layer and have monoclinic symmetry, but have different stacking sequences of the two 1:1 silicate layers. Halloysite also has a composition close to that of kaolinite and is characterized by its tubular nature in contrast to the platy nature of kaolinite particles. Halloysite has a hydrated form with a composition of $Al_2Si_2O_5(OH)_4 \cdot 2H_2O$. This hydrated form irreversibly changes to a dehydrated variety at relatively low temperatures (60° C.) or upon being exposed to conditions of low relative humidity. Trioctahedral magnesium species, chrysotile, antigorite, and lizardite, have a formula of $Mg_3Si_2O_5(OH)_4$. Chrysotile crystals have a cylindrical roll morphology. Antigorite crystals exhibit an alternating wave structure. Lizardite crystals are platy and can include a small amount of substitution of aluminum or ferric iron for both silicon and magnesium.

With respect to the pyrophyllite-talc group of clay minerals, they have a 2:1 layer form with a unit thickness of approximately 9.2 to 9.6 Å. The structure is an octahedral sheet sandwiched by two tetrahedral sheets. Pyrophyllite and talc represent the dioctahedral and trioctahedral members, respectively, of the group. The structural formulas are $Al_2Si_4O_{10}(OH)_2$ for pyrophyllite and $Mg_3Si_4O_{10}(OH)_2$ for talc. Therefore, the 2:1 layers of these minerals are electrostatically neutral and are held together with van der Waals bonding.

Mica clay minerals also have a basic structural unit of the 2:1 layer type like pyrophyllite and talc. Examples include muscovite $(KAl_2(Si_3Al)O_{10}(OH)_2)$, phlogopite $(KMg_3(Si_3Al)O_{10}(OH)_2)$, biotite $(K(Mg, Fe)_3(Si_3Al)O_{10}(OH)_2)$, celadonite $(K(Mg, Fe_{3+})(Si_{4-x}Al_x)O_{10}(OH)_2$, where x=0-0.2), and Glauconite.

The vermiculite clay mineral includes sheets of trioctahedral mica or talc separated by layers of water molecules.

Smectite clay minerals are derived from the structures of pyrophyllite and talc. Unlike pyrophyllite and talc, the 2:1 silicate layers of smectite have a slight negative charge due to ionic substitutions in the octahedral and tetrahedral sheets. The structural formula of smectites include $(Al_{2-y}Mg^{2+}_y)(Si_{4-x}Al_x)O_{10}(OH)_2M^+_{x+y} \cdot nH_2O$, where $M^+$ is the interlayer exchangeable cation expressed as a monovalent cation and where x and y are the amounts of tetrahedral and octahedral substitutions, respectively ($0.2 \leq x+y \leq 0.6$). The smectites with y>x are called montmorillonite and those with x>y are known as beidellite. Nontronites are those in which ferric iron is a dominant cation in the octahedral sheet instead of aluminum and magnesium. Beidellites are those where chromium ($Cr^{3+}$) and vanadium ($V^{3+}$) also are found as dominant cations in the octahedral sheets. Trioctahedral ferromagnesian smectites have the following formula $(Mg, Fe^{2+})_3(Si_{4-x}Al_x)O_{10}(OH)_2M^+/x \cdot nH_2O$.

Chlorite clay minerals include: clinochlore $(Mg_5Al)(Si_3Al)O_{10}(OH)_8$; chamosite $(Fe_5^{2+}Al)(Si_3Al)O_{10}(OH)_8$; pennantite $(Mn_5Al)(Si_3Al)O_{10}(OH)_8$; and (nimite) $(Ni_5Al)(Si_3Al)O_{10}(OH)_8$.

Sepiolite and palygorskite are papyrus-like or fibrous hydrated magnesium silicate minerals. They include two-dimensional tetrahedral sheet of composition $Si_2O_5$ and are regarded as having narrow strips or ribbons of 2:1 layers that are linked stepwise at the corners. The structure of sepiolite is $Mg_8Si_{12}O_{30}(OH)_4(OH_2)_4(H_2O)_8$, and the structure of palygorskite is and $(Mg, Al)_5Si_8O_{20}(OH)_2(OH_2)_4(H_2O)_4$.

Interstratified clay minerals include mixtures of various clay minerals. Examples include rectorite (dioctahedral mica/montmorillonite), tosudite (dioctahedral chlorite/smectite), corrensite (trioctahedral vermiculite/chlorite), hydrobiotite (trioctahedral mica/vermiculite), aliettite (talc/saponite), and kulkeite (talc/chlorite). Other examples include illite/smectite, glauconite/smectite, dioctahedral mica/chlorite, dioctahedral mica/vermiculite, and kaolinite/smectite.

Imogolite clay mineral is an aluminosilicate with an approximate composition of $SiO_2$ $Al_2O_3$ $2.5H_2O$. Allophane is a hydrous aluminosilicate mineral dominated by Si—O—Al bonds—i.e., the majority of aluminum atoms are tetrahedrally coordinated. Unlike imogolite, the morphology of allophane varies from fine, rounded particles through ring-shaped particles to irregular aggregates.

Any of the above noted clay minerals can be used in the context of the present invention. Further, while it is contemplated that natural/non-purified or non-isolated or non-synthetic forms can be used, in certain aspects, the clay minerals can be isolated or purified or synthetically produced. One of the reasons for using isolated or purified or synthetically produced clay minerals is to reduce or remove impurities that may cause or lead to sintering of the minerals or coking on the surface of the minerals when used as a support for a catalyst in reforming reactions. Such impurities that may induce sintering or coking during syngas production include iron, nickel, manganese, sodium, potassium, chloride, calcium, lithium, rubidium, berylium, barium, $SiO_2$, and/or organic impurities. By way of example, when clay minerals are heated at elevated temperatures such as those used in carbon dioxide reformation of hydrocarbons to produce syngas, such impurities (e.g., iron or potassium) within the clay mineral could fuse together. Removal or reducing the amounts of such impurities can therefore help reduce or avoid sintering and/or coking.

For alkaline earth metal/metal oxide supports that can be used in the context of the present invention, such supports have the following general structure: D-E, where D is a $M_1$ or $M_1M_2$, and $M_1$ and $M_2$ are each individually an alkaline earth metal selected from the group consisting of Mg, Ca, Ba, and Sr, and E is a metal oxide selected from the group consisting of $Al_2O_4$, $SiO_2$, $ZrO_2$, $TiO_2$, and $CeO_2$. Specific compounds are disclosed above and throughout this specification. These compounds are commercially available from a wide range of sources (e.g., Sigma-Aldrich® Co. LLC (St. Louis, Mo., USA); Alfa Aesar GmbH & Co KG, A Johnson Matthey Company (Germany)).

All of the support materials can be made by the process used in the examples section of this specification or by processes known to those of ordinary skill in the art (e.g., precipication/co-precipitation, sol-gel, templates/surface derivatized metal oxides synthesis, solid-state synthesis, of mixed metal oxides, microemulsion technique, solvothermal, sonochemical, combustion synthesis, etc.).

C. Catalytic Materials

It is contemplated that any of the known catalytic materials that are currently used in reaction processes that are run at elevated temperatures can be used. The reason for this is that the lanthanide oxide coating reduces sintering, which can make it applicable for a wide variety of catalytic materials. For instance, the catalytic material can be a catalytic metal, such as Pt, Pd, Au, Ag, Ni, Co, Fe, Mn, Cu, Zn, Mo, Rh, Ru, or Ir, or any combination thereof. In some instances, the catalytic material can be a combination of a noble metal and a base metal. Such non-limiting combinations can include PtX, PdX, AuX, AgX, RhX, RuX, or IrX, where X=Ni, Co, Fe, Mn, Cu, Zn, or Mo.

In particular reactions, such as the production of syngas from hydrocarbons, metal catalysts (e.g., Pt, Pd, Au, Ag, Ir, Ni, Co, Rh, Ru, La, Mg, Ca, Sr, Ba, Li, Na, K, Fe, Sn, Cu, Zn, Zr, Mo, Nb, Bi, or Mn, or any combination thereof), metal oxide catalysts (e.g., $La_2O_3$, $Ru_2O_3$, $CeO_2$, $ZrO_2$, ZnO, $MoO_3$, $WO_3$, $Nb_2O_5$, and/or $Ta_2O$), pyrochlore catalysts, and other known catalysts used in the production of syngas from hydrocarbons (e.g., perovskites type solid solutions, various metals like Pt, Pd, Ir, Ni, Co, Rh, Ru, La, Mg, Ca, Sr, Ba, Fe, Sn, Cu, or Zn supported on various metal oxides such as $Al_2O_3$, $SiO_2$, SBA-15, MCM-40, $TiO_2$, $ZrO_2$, $CeO_2$, etc.) can be used. Non-limiting examples of pyrochlore catalysts include those having the following structure:

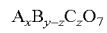

wherein, A is a trivalent ion of an element of La, Ce, Nd, Bi, Sc, or Y, where $0<x<2$, B is a tetravalent ion of an element of Zr, Pt, Pd, Ni, Mo, Rh, Ru, or Ir, where $0<y-z<2$, C is a bivalent, trivalent or tetravalent ion of Ba, Ca, Cu, Mg, Ru, Rh, Pt, Pd, Ni, Co, or Mo, where $0<z<2$.

D. Methods of Making Lanthanide Oxide Coated Catalysts

The lanthanide oxide coated catalyst of the present invention can be made by processes known in the art that provide attachment of the lanthanide oxide to the surface of the support material and/or the catalytic material. The attachment can be through chemical bonds or physical bonds or both. In particular instances, the bonds can be M1-M2 bonds (where M1 is a metal from the lanthanide oxide and M2 is a metal from the support or catalytic material) or M1-O bonds (where M1 is a metal from the lanthanide and O is oxygen from the support or catalytic material) or O-M1 bonds (where O is a metal from the lanthanide oxide and M1 is a metal from the support or catalytic material)

In addition to known methods, it has been discovered that the following process could be used to prepare the lanthanide oxide coated catalysts of the present invention:

Step 1: Catalytic material is dissolved in pore volume equivalent of water and impregnated with support material. Subsequently, the impregnated support material is subject to a drying step (from 100 to 150° C.) for 1 to 3 hours followed by calcination at 150 to 250° C. for 3 to 5 hours.

Step 2: Lanthanide oxide salt is dissolved in pore volume equivalent of water. The material from step 1 is then impregnated with the dissolved lanthanoxide.

Step 3: The mixture from step 2 is dried at 100 to 200° C. for 1 to 3 hours followed by calcination at 800 to 1000° C. for 7 to 9 hours.

The amounts of ingredients can be varied to obtain a desired weight ratio of lanthanide oxide to the catalytic material, to the support material, or to the supported catalyst. Further, the materials can vary to create a desired lanthanide oxide coated catalyst in the context of the present invention. Specific examples of this process are provided in the Examples section.

As illustrated in the Examples section, the produced lanthanide oxide coated catalysts are sinter resistant materials at elevated temperatures, such as those typically used in syngas production or methane reformation reactions (i.e., 700° C. to 1100° C. or a range from 725° C., 750° C., 775° C., or 800° C. to 900° C., 1000° C., or 1100° C.). Further, the produced catalysts can be used effectively in carbon dioxide reforming of methane reactions at a temperature range from 800° C. to 1000° C. or from 800° C. to 1100° C., a pressure range from 1 bara to 30 bara, and/or at a gas hourly space velocity (GHSV) range from 500 to 10000 h$^{-1}$.

In instances when the produced catalytic material is used in carbon dioxide reformation reactions, the carbon dioxide in the gaseous feed mixture can be obtained from various sources. In one non-limiting instance, the carbon dioxide can be obtained from a waste or recycle gas stream (e.g. from a plant on the same site, like for example from ammonia synthesis) or after recovering the carbon dioxide from a gas stream. A benefit of recycling such carbon dioxide as starting material in the process of the invention is that it can reduce the amount of carbon dioxide emitted to the atmosphere (e.g., from a chemical production site). The hydrogen in the feed may also originate from various sources, including streams coming from other chemical processes, like ethane cracking, methanol synthesis, or conversion of methane to aromatics. The gaseous feed mixture comprising carbon dioxide and hydrogen used in the process of the invention may further contain other gases, provided that these do not negatively affect the reaction. Examples of such other gases include steam or oxygen. The hydrocarbon material used in the reaction can be methane. The resulting syngas can then be used in additional downstream reaction schemes to create additional products. Such examples include chemical products such as methanol production, olefin synthesis (e.g., via Fischer-Tropsch reaction), aromatics production, carbonylation of methanol, carbonylation of olefins, the reduction of iron oxide in steel production, etc.

EXAMPLES

The present invention will be described in greater detail by way of specific examples. The following examples are offered for illustrative purposes only, and are not intended to limit the invention in any manner. Those of skill in the art will readily recognize a variety of noncritical parameters which can be changed or modified to yield essentially the same results.

Example 1

Synthesis of $CeO_2$ Coated Catalysts

The following two-step process was used to synthesize a 10 wt % $CeO_2$/2 wt % Pt/$Al_2O_3$ catalyst. In the first step 0.17 g of tetrammine platinum chloride hydrate salt was dissolved in pore volume equivalent of water and impregnated with dried 4.9 g of $Al_2O_3$. The resultant product was first dried at 125° C. for 2 hours followed by calcination at 200° C. for 4 hours. In a second step, 0.5 g of cerium ammonium nitrate salt was dissolved in pore volume equivalent of water and impregnated with Pt/$Al_2O_3$ sample. The resultant mixture was first dried at 150° C. for 2 hours followed by calcination at 900° C. for 8 hours. Additional catalysts were prepared by this method to modify the weight percentage of $CeO_2$ to be 2, 5, and 8 wt %, respectively (i.e., 2 wt % $CeO_2$/2 wt % Pt/$Al_2O_3$; 5 wt % $CeO_2$/2 wt % Pt/$Al_2O_3$; and 10 wt % $CeO_2$/2 wt % Pt/$Al_2O_3$).

The following two-step procedure was used to synthesize a 10 wt % $CeO_2$/2 wt % Pt catalyst grafted on Kaolin support. In the first step 0.17 g of tetrammine platinum chloride hydrate salt was dissolved in pore volume equivalent of water and impregnated with dried 4.9 g of Kaolin. The resultant product was first dried at 125° C. for 2 hours followed by calcination at 200° C. for 4 hours. In a second step 0.5 g of cerium ammonium nitrate salt was dissolved in pore volume equivalent of water and impregnated with Pt/Kaolin sample. The resultant mixture was first dried at 150° C. for 2 hours followed by calcination at 900° C. for 8 hours. Different weight percentages and catalysts can be obtained by adjusting the amount of and types of ingredients as desired.

The following procedure was used to synthesize 10 wt % $CeO_2$/2 wt % Pt catalyst supported on a $MgAl_2O_4$ support. The catalyst was synthesized by a two-step incipient wetness impregnation technique. First, the 10 wt % $CeO_2$/2 wt % Pt catalytic material was synthesized in a two-step process. In the first step 0.17 g of tetrammine platinum chloride hydrate salt was dissolved in pore volume equivalent of water and impregnated with dried 4.9 g of $MgAl_2O_4$. The resultant product was first dried at 125° C. for 2 hours followed by calcination at 200° C. for 4 hours. In a second step, 0.5 g of cerium ammonium nitrate salt was dissolved in pore volume equivalent of water and impregnated with Pt/$MgAl_2O_4$ sample. The resultant mixture was first dried at 150° C. for 2 hours followed by calcination at 900° C. for 8 hours.

The amounts and types of materials can be modified to create a desired catalytic material that is coated with a lanthanide oxide and which has improved sintering (anti-sintering) characteristics.

Example 2

Sintering Effects of $CeO_2$

A 2 wt % Pt/$Al_2O_3$ and 10 wt % $CeO_2$/2 wt % Pt/$Al_2O_3$ were each analyzed by Scanning transmission electron microscopy (STEM). FIG. 1 gives STEM images of 2 wt % Pt/$Al_2O_3$ reduced at 250° C. (A), 2 wt % Pt/$Al_2O_3$ reduced at 800° C. for 4 hours (B) and 10 wt % $CeO_2$/2 wt % Pt/$Al_2O_3$ reduced at 800° C. for 4 hours (C). The 2 wt % Pt/$Al_2O_3$ reduced at 250° C. results in particle of size≈2 nm and homogeneously dispersed (A). FIG. 1(B) is derived from catalyst 2 wt % Pt/$Al_2O_3$ but reduced at 800° C. It is evident that Pt particles have grown in size and particle size ranges from≈2-20 nm. By comparison, the Pt particles in the catalyst 10 wt % $CeO_2$/2 wt % Pt/$Al_2O_3$ catalyst have completely segregated in the presence of $CeO_2$ and could not be seen in STEM images (FIG. 1(C)).

Additional experiments were also performed on the 2 wt % $CeO_2$/2 wt % Pt/$Al_2O_3$, 5 wt % $CeO_2$/2 wt % Pt/$Al_2O_3$, and 10 wt % $CeO_2$/2 wt % Pt/$Al_2O_3$ catalysts. The 2, 5 and 8 wt % $CeO_2$ was not enough to segregate all the Pt particles in the 2 wt % Pt/$Al_2O_3$ catalyst. The minimum amount of $CeO_2$ needed to fully segregate Pt particles in 2 wt % Pt/$Al_2O_3$ was therefore 10 wt %.

The presence of $CeO_2$ overcomes aggregation of Pt metallic particles by segregating them on an atomic scale, which allows for their use as catalysts at elevated temperatures and to avoid catalyst deactivation of catalyst due to sintering effect.

Example 3

CDRM Reaction With 10 wt % $CeO_2$/2 wt % Pt/Kaolin Catalyst

A carbon dioxide reforming of methane (CDRM) reaction was performed a with 10 wt % $CeO_2$/2 wt % Pt/Kaolin catalyst at 800° C. and 1 bara for 20 hours. Prior to the reaction, the catalyst was first reduced in 10% $H_2$ atmosphere at 900° C. for 4 hours. Subsequently, the CDRM reaction was each initiated by changing the gas mixture to 10% $CH_4$+10% $CO_2$+80% $N_2$. Both GC and Mass spectrometer were used to monitor gas composition. The 200-500 mesh size catalyst powder was used for testing, and the GHSV applied was 5000 $h^{-1}$.

Figure 2:
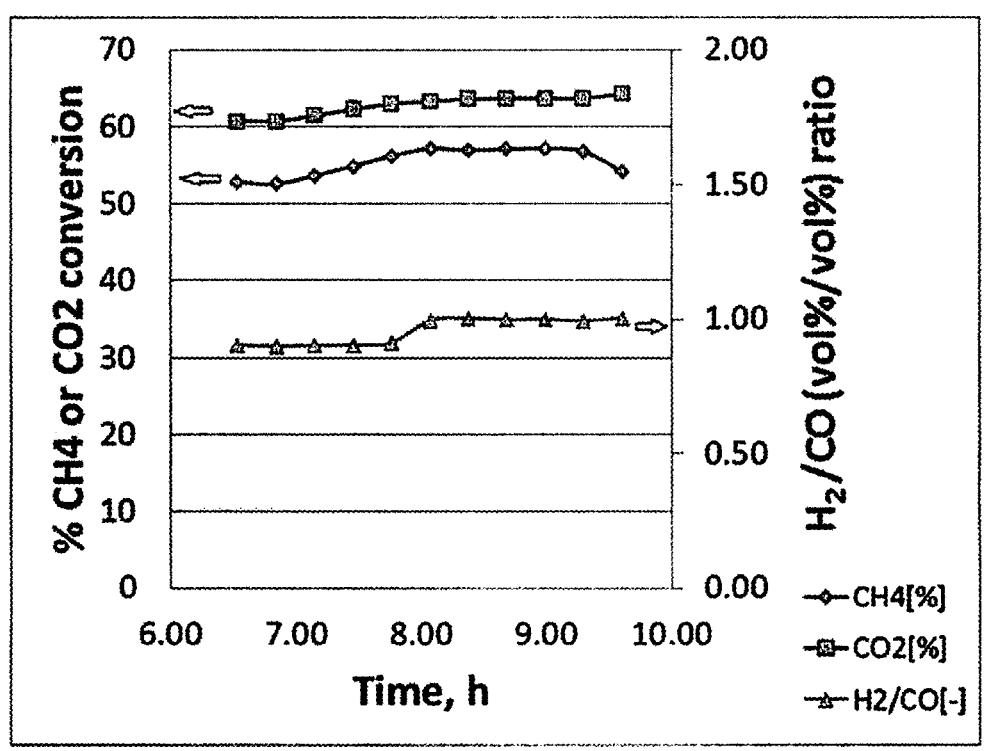
FIG. 2: Carbon dioxide reforming of methane (CDRM) with 10 wt % $CeO_2$/2 wt % Pt/Kaolin catalysts at 800° C. and 1 bara.

The $CO/H_2$ ratio obtained from the reaction was about 1:1 (see FIG. 2). Further, the catalyst was found to be stable without any deactivation for 20 hours of duration. Notably, no sintering nor coke formation was not observed (no appearance of dark black color on catalysts) in any of these catalysts at temperatures above 800° C. The lack of coking was confirmed by performing a loss on ignition test of the used catalysts in an open atmosphere at 800° C. By comparison, coke formation was observed (catalyst turned dark black in color) at a temperature of 700° C. However, no sintering was observed at this reduced temperature.

The invention claimed is:

1. A lanthanide oxide coated catalyst comprising:
   (a) a supported catalyst comprising a support material and a catalytic material; and
   (b) a lanthanide oxide coating that coats at least a portion of the supported catalyst,
   wherein the lanthanide oxide coating includes at least 2 wt. % lanthanide oxide;
   wherein the catalytic material comprises at least one catalytic metal selected from the group consisting of Pt, Pd, Ru and Ir.

2. The lanthanide oxide coated catalyst of claim 1, wherein a weight ratio of the lanthanide oxide to the catalytic material is 5:1 to 10:1.

3. The lanthanide oxide coated catalyst of claim 2, wherein the weight ratio of the lanthanide oxide to the catalytic material is 6:1 to 8:1.

4. The lanthanide oxide coated catalyst of claim 1, comprising 0.1 wt. % to 20 wt. % catalytic material.

5. The lanthanide oxide coated catalyst of claim 1, wherein the weight ratio of the lanthanide oxide to the supported catalyst is from 5:100 to 20:100.

6. The lanthanide oxide coated catalyst of claim 1, comprising 99 to 50 wt. % of the support material.

7. The lanthanide oxide coated catalyst of claim 1, wherein the lanthanide oxide coating includes 2 to 50 wt. % lanthanide oxide.

8. The lanthanide oxide coated catalyst of claim 1, wherein the catalytic material comprises at least one catalytic metal selected from the group consisting of Pd and Ir.

9. The lanthanide oxide coated catalyst of claim 8, wherein the catalytic metal is Pt.

10. The lanthanide oxide coated catalyst of claim 1, wherein the lanthanide oxide is $CeO_2$, $La_2O_3$, $Gd_2O_3$, or any combination thereof.

11. The lanthanide oxide coated catalyst of claim 1, wherein the support material comprises at least one member selected from the group consisting of $Al_2O_3$, $MgAl_2O_3$, kaolinite, $TiO_2$, $ZrO_2$ and $SiO_2$, or any combination thereof.

12. The lanthanide oxide coated catalyst of claim 11, wherein the support material is kaolinite.

13. The lanthanide oxide coated catalyst of claim 11, wherein the catalytic metal is Pt and the lanthanide oxide is $CeO_2$.

14. The lanthanide oxide coated catalyst of claim 1, wherein the catalytic material is a catalytic metal.

15. The lanthanide oxide coated catalyst of claim 1, wherein the support material is $Al_2O_3$.

16. A method of producing a gaseous mixture comprising contacting a reactant gas mixture comprising a hydrocarbon and an oxidant with the lanthanide oxide coated catalyst of claim 1 at a reaction temperature of 700° C. to 1100° C. to produce a gaseous mixture comprising hydrogen and carbon monoxide.

17. The method of claim 16, wherein the reaction temperature is 800° C. to 1000° C.

18. The method of claim 16, wherein the lanthanide oxide coating reduces sintering of the catalytic material.

19. The method of claim 16, wherein the hydrocarbon is methane and the oxidant is carbon dioxide.

* * * * *